(12) United States Patent
Hanis et al.

(10) Patent No.: US 9,998,393 B2
(45) Date of Patent: Jun. 12, 2018

(54) METHOD AND SYSTEM FOR MANAGING RESOURCE CAPABILITY IN A SERVICE-CENTRIC SYSTEM

(71) Applicant: International Business Machines Corporation, Armonk, NY (US)

(72) Inventors: Thomas T. Hanis, Raleigh, NC (US); Claus T. Jensen, Pawling, NY (US); Eoin Lane, Littleton, MA (US); Zhuo Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 14/638,230

(22) Filed: Mar. 4, 2015

(65) Prior Publication Data

US 2016/0261522 A1    Sep. 8, 2016

(51) Int. Cl.
*G06F 15/173* (2006.01)
*H04L 12/911* (2013.01)
*H04L 29/08* (2006.01)
*H04L 12/26* (2006.01)
*H04L 12/24* (2006.01)

(52) U.S. Cl.
CPC ............ *H04L 47/72* (2013.01); *H04L 41/14* (2013.01); *H04L 43/0876* (2013.01); *H04L 67/10* (2013.01); *H04L 67/22* (2013.01); *H04L 47/822* (2013.01)

(58) Field of Classification Search
CPC ..... H04L 47/72; H04L 41/14; H04L 43/0876; H04L 67/10; H04L 67/22
See application file for complete search history.

(56) References Cited

U.S. PATENT DOCUMENTS

| 2003/0142808 A1* | 7/2003 | Hollman | H04L 45/302 379/221.01 |
|---|---|---|---|
| 2007/0240162 A1 | 10/2007 | Coleman et al. | |
| 2009/0248488 A1 | 10/2009 | Shah et al. | |
| 2010/0162401 A1 | 6/2010 | Sakaki | |
| 2013/0185729 A1 | 7/2013 | Vasic et al. | |

OTHER PUBLICATIONS

IBM, Capacity Management Analytics, http://www-03.ibm.com/software/products/en/capacity-management-analytics, printed Mar. 4, 2015.

* cited by examiner

*Primary Examiner* — Brian Whipple
(74) *Attorney, Agent, or Firm* — Terrile, Cannatti, Chambers & Holland, LLP; Stephen A. Terrile

(57) ABSTRACT

A method, system and computer-usable medium are disclosed for managing resource capacity for the provision of cloud-based services. Application deployment and undeployment data is received, and then processed, to perform an update of a capacity-weighted graph to reflect a set of applications deployed in a cloud computing environment. The application deployment and undeployment data is then further processed to determine a set of resource dependencies associated with the set of deployed applications. Thereafter, monitoring operations are performed to monitor consumption of a set of services associated with the set of deployed applications. Further monitoring operations are then performed to monitor requests from the set of deployed applications to predict the need for the provision of a set of additional services for consumption at runtime.

20 Claims, 6 Drawing Sheets

METHOD AND SYSTEM FOR MANAGING RESOURCE CAPABILITY IN A SERVICE-CENTRIC SYSTEM

BACKGROUND OF THE INVENTION

Field of the Invention

The present invention relates in general to the field of computers and similar technologies, and in particular to software utilized in this field. Still more particularly, it relates to a method, system and computer-usable medium for managing resource capacity for the provision of cloud-based services.

Description of the Related Art

Generally speaking, cloud computing is a model of service delivery for enabling on-demand network access to a shared pool of physical and virtual computing resources that can be dynamically provisioned and released with minimal management effort or interaction with the provider of a service. As such, cloud computing allows a service consumer to access shared resources, such as networks, network bandwidth, servers, processing, memory, storage, applications, virtual machines, and services as a service on an as-needed basis. These services may be provided in a variety of forms, including Infrastructure as a Service (IaaS), Platform as a Service (PaaS), Software as a Service (SaaS), Data as a Service (DaaS), and so forth. In recent years, it has become common to provide access to these various services by publishing an associated web application program interface (API). The publishing of such APIs has resulted in the evolution of an "API economy," which facilitates the exchange of business functions, capabilities and competencies.

The sharing of pooled resources additionally allows cloud computing to achieve economies of scale, whether the cloud environment is public, private or hybrid. For example, a public cloud may elastically provide a variety of services to various organizations or users for free or on a pay-per-usage model. Conversely, a private cloud is a cloud infrastructure operated solely for a single organization, whether it is hosted and managed by the organization itself, a third-party, or a combination thereof. A hybrid cloud is a composite of two or more clouds, private or public, that remain distinct entities yet offer the benefits of multiple deployment models and services. As an example, an organization may have deployed various computing resources in a private cloud environment, which provide a limited amount of processing capability and data storage capacity. To continue the example, the organization may sometimes require computing resources, or services, beyond those available in its private cloud. When it does, needed computing resources, services, or both, can be provided by one or more public clouds.

However, ensuring the availability of various shared resources in a cloud environment can prove challenging. Large public cloud providers typically address this issue through the implementation of large-scale analytics and prediction models to predetermine which resources may be needed, and to what degree, by each service at a given time. Such approaches are not always practical, or cost effective, for organizations that have implemented a private cloud as the resource capacity needed for common services are typically a function of each application's usage. More particularly, shared resources are generally not committed to a specific service instance, or even a specific service type, in a private cloud environment. As a result, anticipating the capacity requirements for individual services can often be problematic.

SUMMARY OF THE INVENTION

A method, system and computer-usable medium are disclosed for managing resource capacity for the provision of cloud-based services. In various embodiments, a capacity-weighted graph is generated, which is configured to receive application deployment and undeployment data associated with a plurality of applications implemented within a cloud computing environment. In these embodiments, a first set of application deployment and undeployment data is processed to perform a first update of the capacity-weighted graph to reflect a first set of deployed applications. The first set of application deployment and undeployment data is then further processed to determine a first set of resource dependencies associated with the first set of deployed applications. Thereafter, monitoring operations are then performed to monitor consumption of a first set of services associated with the first set of deployed applications. Further monitoring operations are then performed to monitor requests from the first set of deployed applications to predict the need for the provision of a first set of additional services for consumption at runtime.

In various embodiments, a second set of application deployment and undeployment data is received, and then processed, to perform a second update of the capacity-weighted graph to reflect a second set of deployed applications. The second set of application deployment and undeployment data is then further processed to determine a second set of resource dependencies associated with the second set of deployed applications. Thereafter, monitoring operations are then performed to monitor consumption of a second set of services associated with the second set of deployed applications. Further monitoring operations are then performed to monitor requests from the second set of deployed applications to predict the need for the provision of a second set of additional services for consumption at runtime.

In various embodiments, resource capacity prediction operations are performed to determine global resource capacity within the cloud computing environment for a service associated with an individual application of the plurality of applications. In certain embodiments, a set of resources is associated with each service that is a member of the first and second sets of services and each service that is a member of the first and second set of additional services. In various embodiments, the capacity-weighted graph includes a list of records configured to maintain a record of the consumption of individual services that are members of the first and second set of services by each member of the first and second set of deployed applications. In certain embodiments, the first and second sets of resource dependencies are determined through the use of a partial topic map associated with the capacity-weighted graph.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
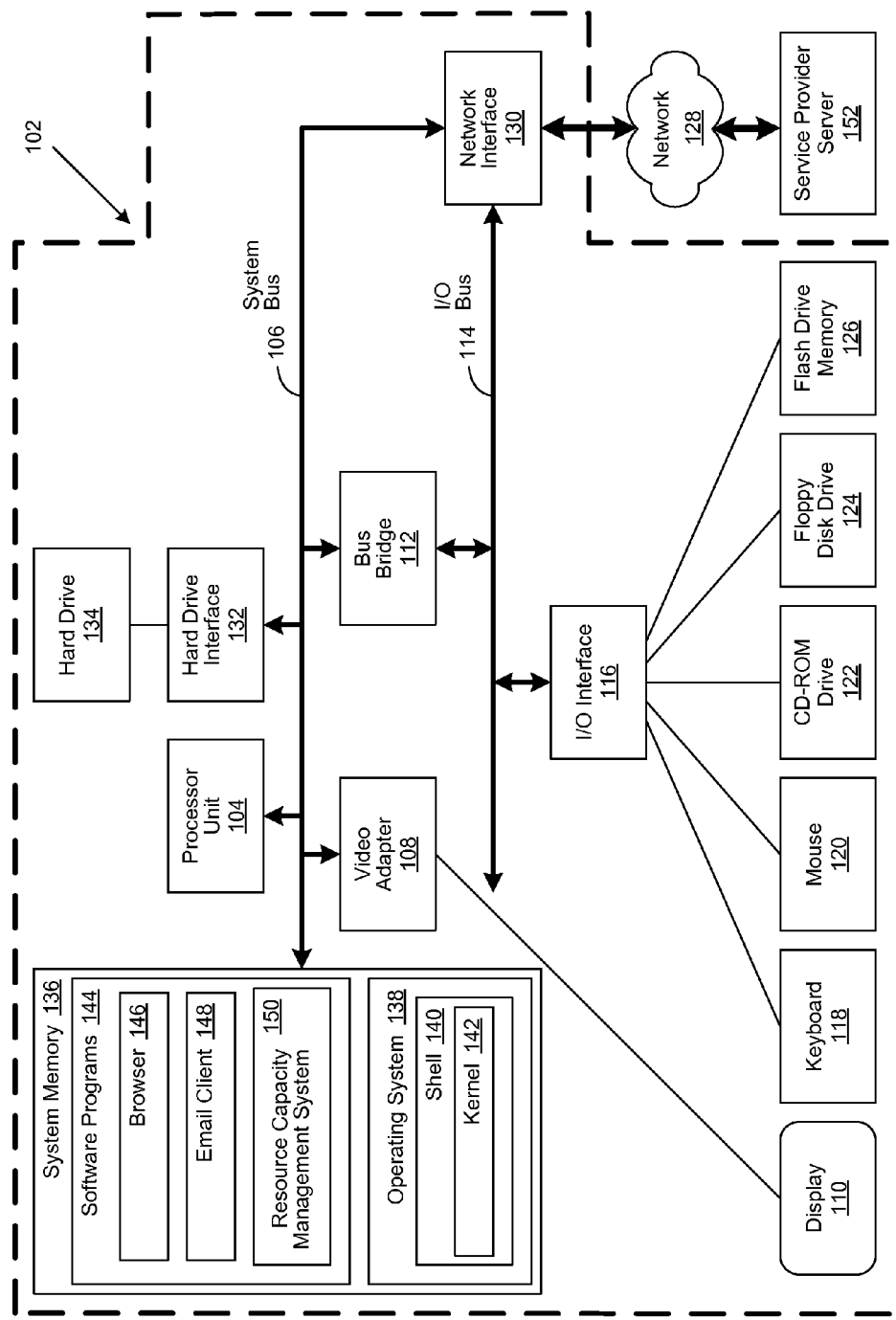
FIG. 1 depicts an exemplary client computer in which the present invention may be implemented.

A method, system and computer-usable medium are disclosed for managing resource capacity for the provision of cloud-based services. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management. Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. In various embodiments, software programs 144 may also include a resource capacity management system 150. In these and other embodiments, the resource capacity management system 150 includes code for implementing the processes described hereinbelow. In one embodiment, client computer 102 is able to download the resource capacity management system 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit, scope and intent of the present invention.

Figure 2:
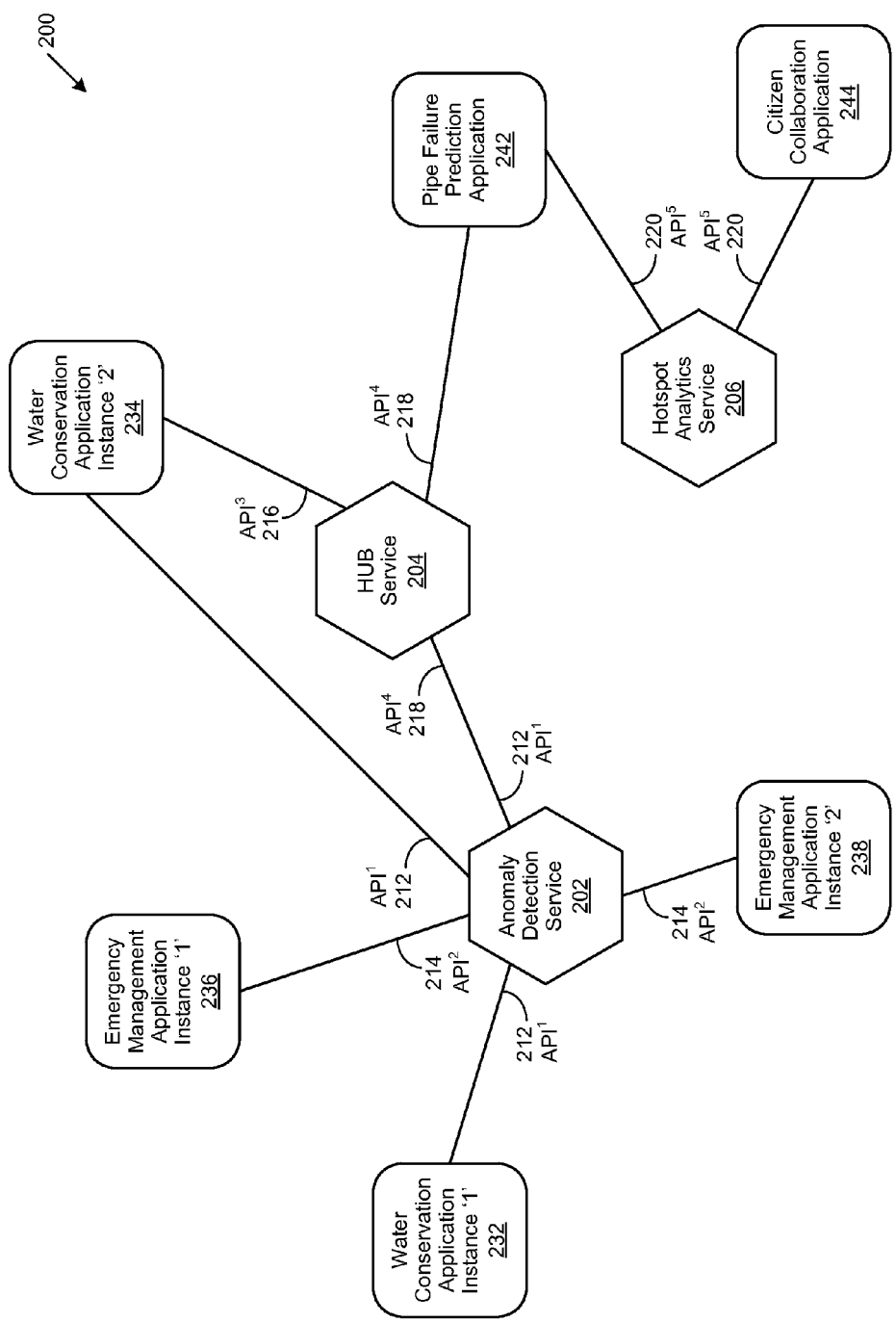
FIG. 2 is a simplified relationship model showing the relationships between services and associated applications implemented within a cloud computing environment.

FIG. 2 is a simplified relationship model showing the relationships between services and associated applications implemented in accordance with an embodiment of the invention within a cloud computing environment. In various embodiments, the relationship model 200 is an entity relationship model (ERM). As used herein, an ERM broadly refers to a data model that provides an abstract and conceptual representation of data. Accordingly, it is common to use entity-relationship modeling to produce a conceptual schema or semantic data model of a system, such as a cloud computing environment, and its requirements, in a top-down manner.

Skilled practitioners of the art will be aware of various approaches for managing the elasticity of capacity requirements associated with predetermined applications or workloads, as well as for predicting future resource capacity needs. These same practitioners of the art will likewise be aware of approaches for understanding dependency relationships between service providers and service consumers, not only at development time, but at runtime as well. These approaches typically rely upon observable behavior and dependencies at a functional level for an operational system, predictive analytics for functional operation based upon a static understanding of the system, workload management within the context of a functional system, or a combination thereof. However, these approaches, individually or in combination, fail to provide dynamic management of capacity relationships between applications and common, externalized services, such that the elasticity requirements of applications, whether current or predicted, can be translated to reflect the capacity needs of those externalized services. As used herein, such externalized services broadly refer to services that are used by an application but are not a part of that application. More specifically, these externalized services are not coded within the application, deployed as part of the application, nor would they necessarily provide service to an individual application.

Furthermore, various applications deployed in a cloud environment, whether public, private, or hybrid, will typically have relationships with multiple services, which the applications consume as part of its operation. It will be appreciated that one challenge for deployments of such applications and services, especially in a shared, multi-tenant cloud environment, is to be able to match the deployment topology to resource capacity needs, both at the application level and shared services level. Those of skill in the art will be aware that current approaches to managing resource capacity, including usage prediction, are typically implemented at the application level. However, these approaches are not intended to extend from an individual application or set of applications to their respectively shared services such that the entire ecosystem of capacity resource needs can be met in an elastic manner.

In various embodiments, a resource capacity management system is implemented to predict aggregate resource capacity elasticity associated with the provision of a predetermined set of cloud services that are being consumed by a plurality of applications, each of which has corresponding resource capacity requirements. In certain of these embodiments, multiple instances of the same application may run concurrently. As used herein, resource capacity elasticity broadly refers to the ability to provide sufficient resource capacity, as it is needed, to ensure the availability and provision of a predetermined set of cloud services when and as they are requested.

In various embodiments, the resource capacity management system is implemented in a private cloud to predict the anticipated capacity elasticity of individual resources used to provide a predetermined set of cloud services. In certain of these embodiments, the resource capacity management system is further implemented to create a hybrid cloud when the resource capacity of the private cloud is exhausted. In these and other embodiments, the hybrid cloud provides additional resource capacity to ensure the availability and provision of the predetermined set of cloud services when and as they are requested. The method by which the hybrid cloud is created, and the additional resource capacity is provided, is a matter of design choice.

In various embodiments, a relationship model 200, such as an ERM, is implemented to associate application types, and individual application instances, with common services through defined execution relationships. As used herein, common services broadly refer to externalized services, as described in greater detail herein. In these embodiments, each of the common services provide a predetermined set of callable Application Program Interfaces (APIs), each of which, in turn, have associated API calls with various execution time impact characteristics. Accordingly, by knowing which applications are dependent upon which APIs, and likewise knowing the resource capacity usage characteristics of each service on a per-API basis, the capacity requirements of each service can be determined through various aggregation or synthesis approaches. Likewise, various analytics approaches known to those of skill in the art can be used to predict future resource capacity usage by each application, which can then be aggregated or synthesized by referencing the relationship model to derive a resource capacity prediction for each associated service. The particular analytics approaches used to predict future resource capacity usage, and the method by which the resulting predicted usage information is aggregated or synthesized, is a matter of design choice.

Referring now to FIG. 2, the relationship model 200 includes an anomaly detection service 202, a HUB service 204, a hotspot analytics service 206, and a first 232 and second 234 instance of a water conservation application. In this embodiment, the HUB service 204 is a externalized or common service, described in greater detail herein. The relationship graph 200 likewise includes a first 236 and second 238 instance of an emergency management application, a pipe failure prediction application 242, and a citizen collaboration application 244. As shown in FIG. 2, the anomaly detection service 202, the HUB service 204, and the hotspot service 206 are each implemented with one or more APIs. For example, the anomaly detection service 202 is implemented with $API^1$ 212 and $API^2$ 214, while the HUB service 204 is implemented with $API^3$ 216 and $API^4$ 218, and the hotspot analytics service 206 is implemented with $API^5$ 220.

As likewise shown in FIG. 2, $API^1$ 212 and $API^2$ 214 are respectively implemented to provide an interface for the first 232 and second 234 instances of the water conservation application, and the first 236 and second 238 instances of the emergency management application, to the anomaly detection service 202. Likewise, $API^3$ 216 and $API^4$ 218 are respectively implemented to provide an interface for the second 234 instance of a water conservation application, and the pipe failure prediction application 242, to the hub service 204. $API^5$ 220 is likewise implemented to provide an interface for the pipe failure prediction application 242, and the citizen collaboration application 244, to the hotspot analytics service 206. Likewise, $API^1$ 212 and $API^4$ 218 are respectively implemented with the anomaly detection service 202 and the HUB service 204 to provide an interface between each other for bidirectional consumption of services. In various embodiments, an individual service, such as the anomaly detection service 202 and the HUB service 204, are implemented with two or more APIs. For example, as show in FIG. 2, the anomaly detection service 202 is implemented with $API^1$ 212 and $API^2$ 214, while the HUB service 204 is implemented with $API^3$ 216 and $API^4$ 218. In these embodiments, $API^1$ 212, $API^2$ 214, $API^3$ 216, and $API^4$ 218 may respectively be called by one or more applications.

Figure 3:
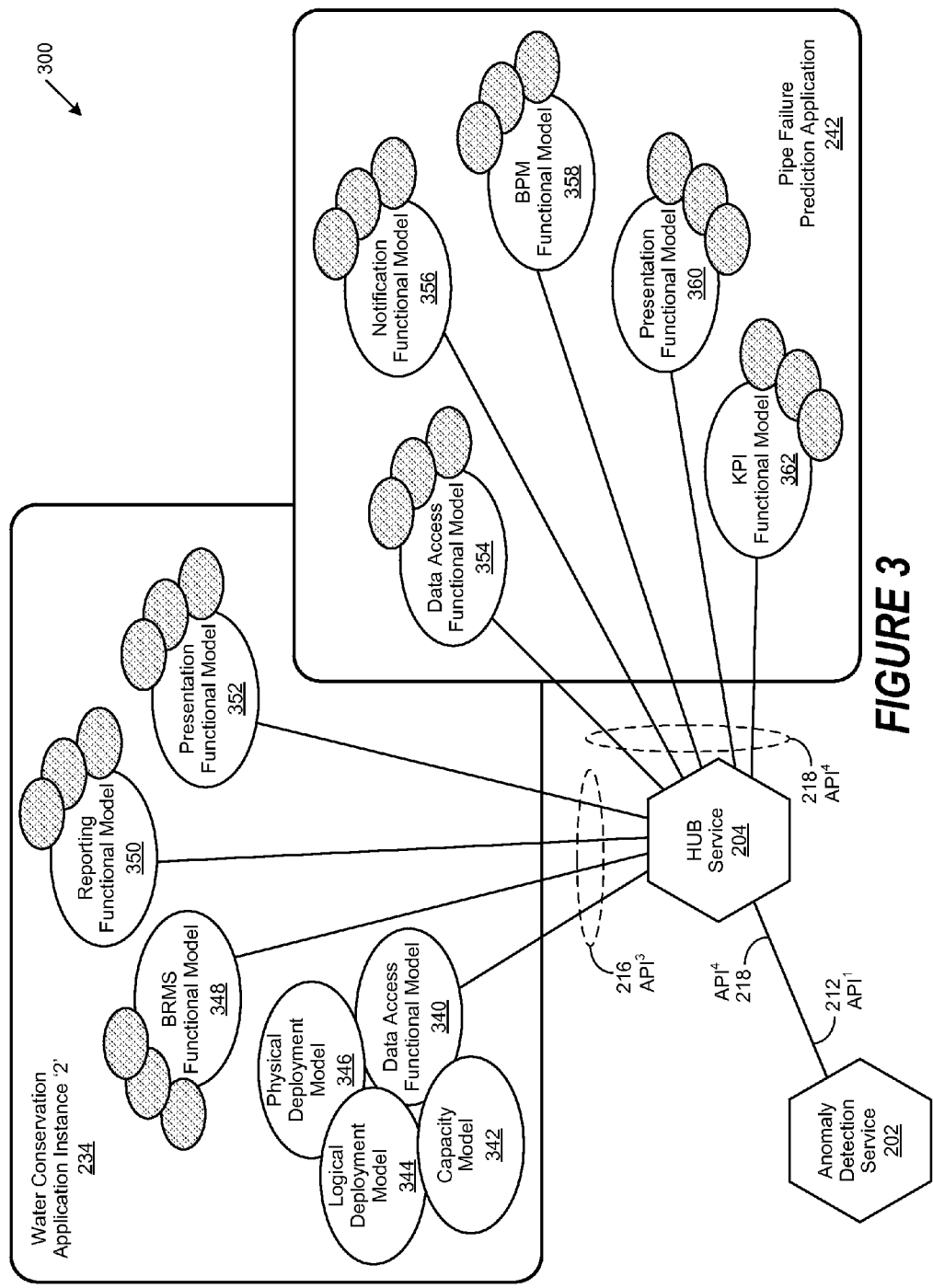
FIG. 3 depicts the implementation of functional, logical, physical and capacity models to link a subset of the services and applications shown in FIG. 2.

FIG. 3 depicts functional, logical, physical and capacity models implemented in accordance with an embodiment of the invention within a cloud computing environment to link a subset of the services and applications shown in FIG. 2. As used herein, a functional model broadly refers to a metamodel that represents the components of a software environment from a functional capability perspective. In various embodiments, these functional components are implemented with corresponding code deployment entities. As likewise used herein, a logical model broadly refers to a metamodel that represents the components of a software environment from a logical capability perspective. In various embodiments, these logical component are implemented to provide organizational information related to components of the software system. In these embodiments, the logical component may or may not have correspondingly-defined code deployment entities. Likewise, as used herein, a physical model broadly refers to a metamodel that represents the physical deployment of a software environment. A capacity model, as used herein, broadly refers to a metamodel that represents the overall capacity needs of a software environment at the component level.

In this embodiment, a cloud computing environment 300 includes a HUB service 204, an anomaly detection service 202, a second instance 234 of a water conservation application, and a pipe failure prediction application 242. As shown in FIG. 3, the second instance 234 of the water conservation application and the pipe failure prediction application 242 respectively consume services from the HUB service 204 through $API^3$ 216 and $API^4$ 218. Likewise, $API^1$ 212 and $API^4$ 218 are respectively implemented with the anomaly detection service 202 and the HUB service 204 to provide an interface between each other for bidirectional consumption of services.

The second instance 234 of a water conservation application provides associated functional deployment capabilities, which are represented by a data access functional model 340, a business rule management system (BRMS) functional model 348, a reporting functional model 350, and a presentation functional model 352. The pipe failure prediction application 242 likewise provides associated functional deployment capabilities, which are represented by a data access functional model 354, a notification functional model 356, a business process management (BPM) functional model 358, a presentation functional model 360, and a key performance indicator (KPI) functional model 362. In turn, each of these functional models is associated with a corresponding capacity model 342, a logical deployment model 344, and a physical deployment model 346.

These associated sets of functional, logical, physical and capacity models are implemented in this and other embodiments to provide contextual information, which can then be used to ensure capacity resource elasticity for the cloud computing environment 300, including common services. In certain embodiments, the contextual information is used in predictive approaches known to those of skill in the art to anticipate future resource capacity requirements. In turn, the anticipated future resource capacity requirements can be used by known platform management approaches implemented at the hardware, operating system (OS) and framework layers to provide an elastic system by scaling resource capacity up and down at the application and service layers.

In this and other embodiments, as described in greater detail herein, the following operations are performed to define, manage and predict resource capacity elasticity for service deployments in the cloud computing environment 300:

Create an initial capacity-weighted graph

Update the capacity-weighted graph based upon deployments and undeployments of applications Analyze application code for dependencies Analyze runtime topology (e.g., determine application instances, etc.)

Monitor service consumption (e.g., identify applications that were not previously known)

Figure 4:
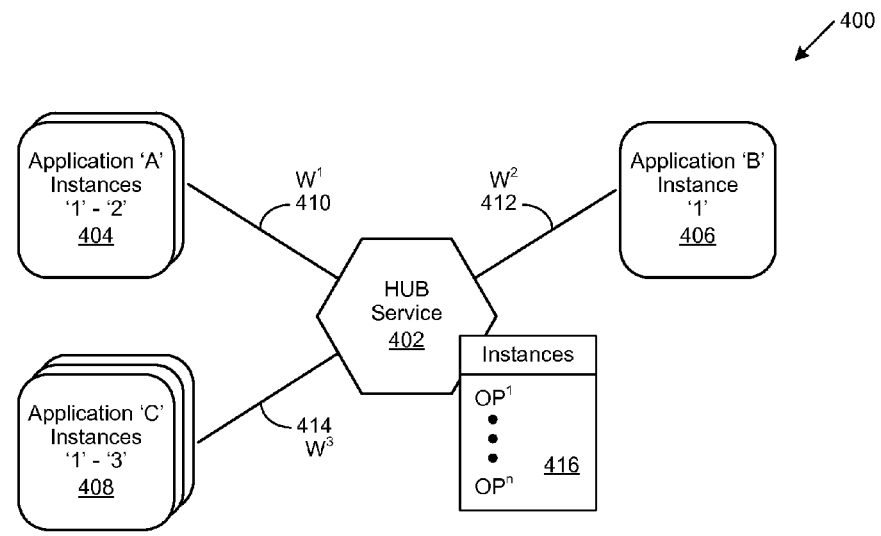
FIG. 4 shows a capacity-weighted graph used to manage resource capacity in a cloud computing environment.

Monitor requests from services and applications for additional resources at runtime Predict global resource capacity needed for a service at runtime FIG. 4 shows a capacity-weighted graph implemented in accordance with an embodiment of the invention to manage resource capacity in a cloud computing environment. As used herein, a capacity-weighted graph broadly refers to a graph whose edges have associated weight values corresponding to associated capacity requirements. In this embodiment, the capacity-weighted graph 400 shows the relationship between a HUB service 402 and various instances of applications 'A' 404, 'B' 406 and 'C' 408, each of which consumes services from the HUB service 402. For example, the capacity-weighted graph 400 shows two instances of application 'A' 404, a single instance of application 'B' 406, and three instances of application 'C' 408.

In various embodiments, a weighted graph, such as a topic map, is used to generate the capacity-weighted graph 400. As used herein, a topic map broadly refers to a standard for the representation and interchange of knowledge. Skilled practitioners of the art will be familiar with topic maps, which facilitate the location of information through the implementation of a meta-model. Such meta-models allow topics, associations, and occurrences to be typed, where the types are defined by the one or more creators of the topic map. The definitions of allowed types are in turn used to provide the ontology of the topic map.

In certain embodiments, the weighted graph is generated from a semantic-based, weighted learning graph, which in turn is based upon a weighted topic map. In various embodiments, a weighted topic map is implemented to provide a hypergraph metamodel representation of associations between topics and topic occurrences. As likewise used herein, a weighted learning graph broadly refers to a weighted graph that is implemented with the ability for the weight factors to be determined or refined by the use of system learning methods familiar to those of skill in the art.

In various embodiments, the resulting capacity-weighted graph 400 also includes a list of records 416, each of which may include the name of a service consumer application or an associated identifier, such as application 'A' 404, 'B' 406 and 'C' 408. In these and other embodiments, the list of records 416 maintains a record of the individual instances of service consumers, by application or application instance. In certain embodiments, the list of records 416 may likewise include a list of instances of each application, the expected capacity requirements for all instances of the application, the service it consumes, and associated operations, such as operations $OP^1$ through $OP^n$. In certain embodiments, an application (e.g., application 'A' 404, 'B' 406, 'C' 408, etc.) may consume more than a single service, dependent upon which service is called. In these embodiments, the various services consumed by each application is recorded in the list of records 416.

In various embodiments, the resource capacity required for various shared services, such as the HUB service 402, is derived from contextual information associated with one or more calling applications, such as application 'A' 404, 'B' 406 and 'C' 408. As used herein, as it applies to capacity resource capacity management, contextual information broadly refers to a set of metrics associated with a application that can be used to determine a needed data element. In various embodiments, the contextual information is used to determine the capacity respectively needed at the service level for a predetermined application, such as application 'A' 404, 'B' 406 and 'C' 408. In certain embodiments, the contextual information may be used to determine dependent services, and related resources (e.g., hardware, etc.).

Initially, the weight of the capacity-weighted graph 400 is defined through the association of expected resource capacity required per unit of work, such as operations $OP^1$ through $OP^n$ listed in the list of records 416, with each calling application, such as application 'A' 404, 'B' 406 and 'C' 408. In various embodiments, the anticipated resource capacity that will be needed is annotated for each relationship between an application and a service that it consumes, extending the dependency graph to a capacity-weighted dependency graph. In this embodiment, applications 'A' 404, 'B' 406 and 'C' 408 are respectively annotated with resource capacity weightings of $W^1$ 410, $W^2$ 412 and $W^3$ 414 in the capacity-weighted graph 400 for services consumed from the HUB service 402. As a result, the weight of the capacity-weighted graph 400 is the sum of the resource capacity weightings $W^1$ 410, $W^2$ 412 and $W^3$ 414.

Figure 5:
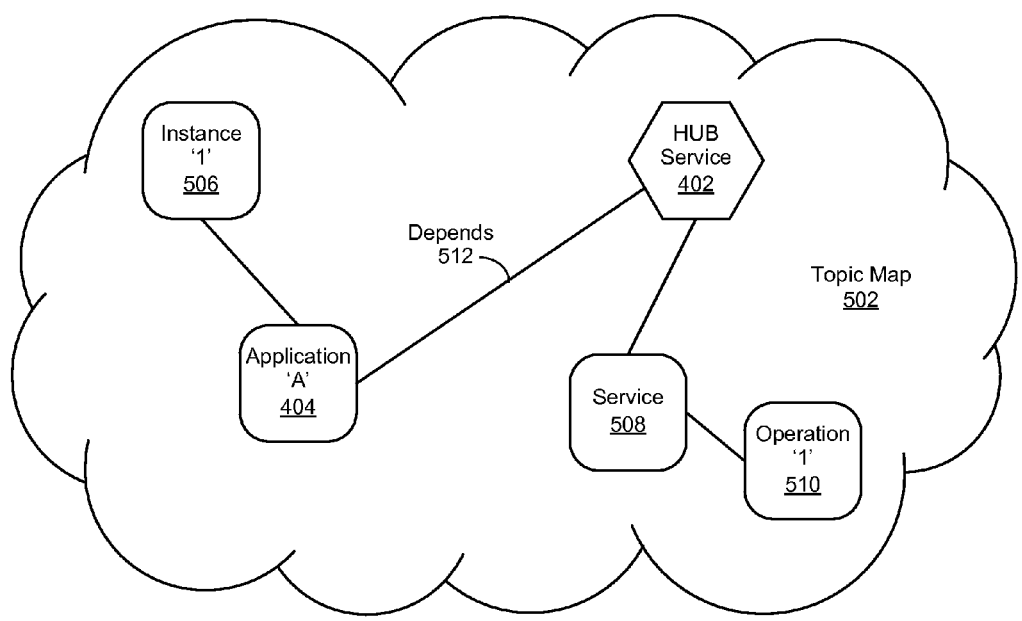
FIG. 5 depicts a partial topic map of the capacity-weighted graph shown in FIG. 4.

FIG. 5 depicts a partial topic map of the capacity-weighted graph shown in FIG. 4 and implemented in accordance with an embodiment of the invention. In this embodiment, application 'A' 404 requests services from the HUB service 402, which in response provides the requested services. Accordingly, there is a 'depends' 512 association between application 'A' 404 and the HUB service 402, as application 'A' 404 is dependent upon the HUB service 402 to provide the requested services, such as service 508. Those of skill in the art will recognize that provision of service 508 may result in the performance of one or more operations, such as operation '1' 510, which in turn will result in the consumption of one or more resources. In certain embodiments, application 'A' 404 may include lower level APIs. In these embodiments, the "depends" association for the lower level APIs can be modeled in the same.

In this embodiment, the "depends" association 512 between application 'A' 404 and the HUB service 402 shown in the topic map 502 can be defined as follows:

$ID_1$=ID of the "depends" association (e.g., '10100')

$T_1$=an instance of a calling application (e.g., instance '1' 506 of application 'A' 404)

$T_2$=an instance of an API (e.g., the HUB service 402)

$R_1$=Requestor of the HUB service 402 (e.g., application 'A' 404 requesting service 508)

$R_2$=Responder to the requestor of the service (e.g., the HUB service 402 is a Responder to App 'A' 404, which is the requestor)

$S_1$=scope of any kind (e.g., temporal, not currently defined, etc.)

$W_1$=weight of the "depends" association 512 (e.g., weight='70')

In the case above, where the weight of the "depends" association is 70, the following are the topic map representation for the weight for the App 'A'—HUB Service "depends" association.

The weight can then be added as follows: $ID_1 W_1\ ID_1\ R_3\ W_1\ R_4\ S_{10}$ . . . , where:

$ID_1 W_1$=unique ID of the "depends" association (e.g., '10101')

$ID_1$=ID of the "impacts" association (e.g., '10100')

$R_3$=association ID role $W_1$=70

$R_4$=weight role

In various embodiments, user input is received, which may include the updating of records, adding records, deleting records, or some combination thereof within the resource capacity management system. In these embodiments, the user input may result in adjustments to predetermined baseline values for the resource capacity management system. In these various embodiments, the user input can be initiated, or repeated, at any time during the operation of the resource capacity management system.

In various embodiments, the capacity-weighted graph 400 described in the descriptive text associated with FIG. 4 is updated whenever an application deployment or undeployment event occurs. As used herein, an application deployment event broadly refers to the execution of a first, or additional, instance of an application, such as application 'A' 404, at runtime. Conversely, an application undeployment event broadly refers to removal of an existing instance of an application at runtime.

In these embodiments, the list of records 416 described in the descriptive text associated with FIG. 4 is accessed for all records {A, B, C, D}, with B, C and D being a predetermined value, whenever a new instance (e.g., instance '1' 506) of application 'A' 404 is deployed. In certain embodiments, the cloud computing environment includes more than one capacity-weighted graph, such as the capacity-weighted graph 400 described in descriptive text associated with FIG. 4. In these embodiments, the list of records 416 associated with each of these capacity-weighted graphs is accessed for all records {A, B, C, D}. Each record is then updated to reflect {A, B plus the new application instance, C plus the resource capacity needed for new application instance, D}, which has the effect of increasing resource capacity demands correspondingly.

In various embodiments, the resource capacity generally required for the new instance of application 'A' 404 corresponds to a standardized resource capacity from the list of applications 416 maintained by the resource capacity management system {application, standard capacity per application instance}. Should the new instance (e.g., instance '1' 516) of application 'A' 404 have expected consumption characteristics different from the existing instances of application 'A' 404, the resource capacity management system may instead add a record {A', 1, C', D}, treating this new instance of application 'A' 404 as a different root application for resource capacity planning purposes. As used herein, a root application broadly refers to a predetermined application (e.g., application 'A' 404, 'B' 406 and 'C' 408), which is used to deploy one or more additional instances of the application. In these embodiments, the resource capacity management system keeps track of all the different variants of application 'A' 404 that are instances of the same underlying application.

Likewise, the list of records 416 described in descriptive text associated with FIG. 4 is accessed for all records {A, B, C, D}, with B, C and D being a predetermined value, whenever an existing instance (e.g., instance '1' 506) of application 'A' 404 is undeployed. Each record is then updated to reflect {A, B minus the new application instance, C, D}, which has the effect of reducing resource capacity demands correspondingly. For capacity planning purposes when a new version of an application is deployed, this corresponds to undeployment of the old version followed by deployment of the new version.

In various embodiments, the application code associated with application 'A' 404 is then analyzed for dependencies, such as the "depends" association 512, to further update the resource capacity planning graph. Those of skill in the art will recognize that the implementation of the resource capacity planning graph provides the ability to assign resources, such as computational capacity, to meet the needs of a predetermined application. Likewise, the implementation of the resource capacity planning graph provides the ability to predict future resource needs such that capacity can be allocated before it becomes a critical bottleneck.

In certain of these embodiments, the weight of a weighted learning graph is refined through calculation using Bayesian probabilities. In these various embodiments, the weights of the connections between various applications, such as applications 'A' 404, 'B' 406 and 'C' 408 shown in FIG. 4, and a shared service, such as the HUB service 402, is calculated according to various predetermined dimensions. For example, as shown in FIG. 4, there are two instances of application 'A' 404 that have been deployed, while the HUB service 402 is servicing a total of three calling applications.

In various embodiments, a calling application, such as the pipe failure prediction application 242 shown in FIG. 3, may have a decomposed API accessing a shared service, such as the HUB service 402. For example, the pipe failure prediction application 242 shown in FIG. 3 may be represented as a business service, which can be provided by calling other services through their associated APIs. To continue the example, the pipe failure prediction application 242 can be decomposed into four APIs, two of which (the data access functional model 354 and the KPI functional model 362), are accessing the HUB service 402.

In these embodiments, the records {A, B, C, D} in the capacity planning graph are then updated to {A,B,C',D} such that C' now represents the new understanding of the expected resource capacity needs across the list of A instances B. In certain embodiments, the analysis may result in splitting the record into multiple different records if and when the analysis determines that different application instances have fundamentally different capacity needs, such as treating A and A' as two different applications for resource capacity planning purposes.

In various embodiments, the runtime topology of the cloud computing environment is analyzed, and its associated service consumption is monitored, to further update the capacity planning graph. In certain of these embodiments, the topology of the cloud computing environment is analyzed to determine new relationships between applications, such as application 'A' 404' and a service, such as the HUB service 402. Likewise, in certain embodiments, the weighting of existing relationships between applications and services, as described in greater detail herein, is refined. Skilled practitioners of the art will be aware that the maintenance of usage metrics for operational control, trace and debugging, audit control, entitlement and billing is typically a part of normal service-provider operations in a cloud computing environment. In various embodiments, these metrics, along with other real-time observations such as network requests, data access, and so forth, may be used to provide runtime refinements to the weighted-capacity graph.

As an example, when a new instance (e.g., instance '1' 506) of application 'A' 404 is detected at runtime through monitoring or observation of service calls, the list of records 416 described in descriptive text associated with FIG. 4 is accessed for all records {A, B, C, D}, with B, C and D being a predetermined value. Each record is then updated to reflect {A, B plus the new application instance, C plus the resource capacity needed for new application instance, D}, which has the effect of increasing resource capacity demands correspondingly.

In various embodiments, the resource capacity generally required for the new instance of application 'A' 404 corresponds to a standardized resource capacity from the list of applications 416 maintained by the resource capacity management system {application, standard capacity per application instance}. Should the new instance (e.g., instance '1' 516) of application 'A' 404 have expected consumption characteristics different from the existing instances of application 'A' 404, the resource capacity management system may instead add a record {A', 1, C', D}, where '1' represents a new instance of application 'A' 404, thereby treating this new instance of application 'A' 404 as a different root application for resource capacity planning purposes. In these embodiments, the resource capacity management system keeps track of all the different variants of application 'A' 404 that are instances of the same underlying application.

If an instance (e.g., instance '1' 506) of application 'A' 404 is not observed to be active for a prolonged period of time, the record {A,B,C,D} in the capacity-weighted graph is updated to {A,B',C',D} where B' is equal to B adjusted for the instance of A now being inactive, and C' equals C minus the resource capacity previously assigned to the now inactive instance of application 'A' 404. Should this particular instance of application 'A' 404 be observed to be active again at a later point in time, the original values will be restored.

In various embodiments, application and service requests for additional or fewer resources at runtime in the cloud computing environment are monitored and then used to further update the capacity planning graph. In these embodiments, information provided in the weighted-capacity model is used in conjunction with real-time application and service consumption updates to support needed resource capacity for individual application or service resource requests. Accordingly, these requests will be driven from the weighted-capacity model as it changes to reflect current resource request observations. In this way we can use predictive approaches known to those of skill in the art can be used to support projected changes and proactively drive needed operational resource changes from the model as reflected by predictive analytics.

For example, if a service 'X' observes more requests for a resource than it has the current capacity to provide, it can notify the resource capacity management system that it is being over-utilized. In this example, the resource capacity management system can then subsequently update all records {A, B, C, X} to {A, B, C', X}, where C' equals C with an added fraction of resource capacity corresponding to the declared level of overload on service 'X'.

As another example, when an instance of application 'A' 404 determines at runtime that it needs more, or fewer, calls to service 'X' than was previously expected, it can notify the resource capacity management system about the expected change. In this example, the resource capacity management system can then subsequently update all records {A, B, C, D} to {A, B, C', D} where C' is C adjusted for the expected change declared by the instance of application 'A' 404.

In certain embodiments, application 'A' notifies the operational system about its intent to change the resource capacity required from one or more predetermined services being consumed at a particular future point in time. In these embodiments, the operational system treats such notifications as if they were observed operational changes, thereby proactively adjusting the operational to cope with increased resource capacity in advance.

Figure 6:
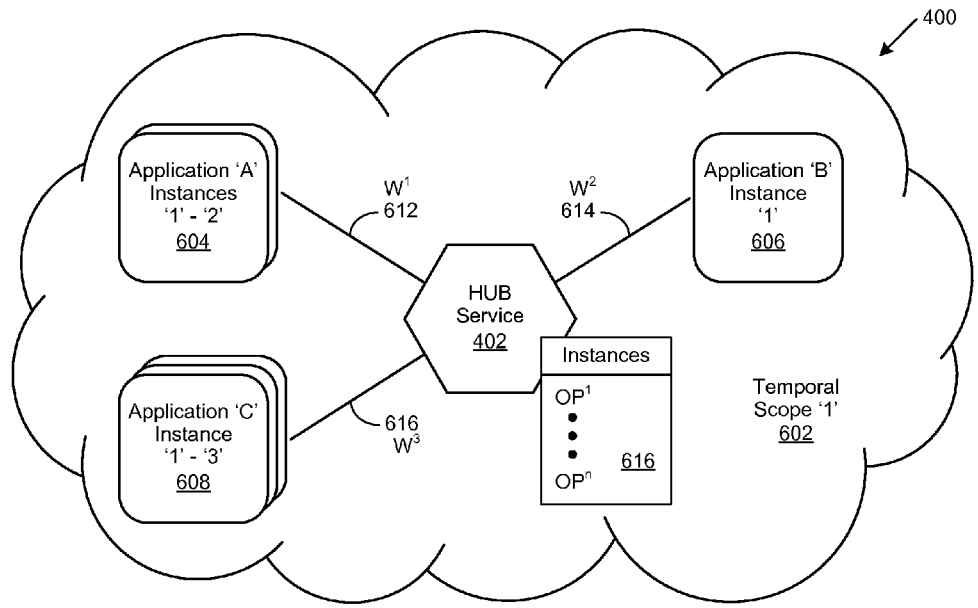
FIGS. 6 and 7 depict a capacity-weighted graph implemented at different points in time.
Figure 7:
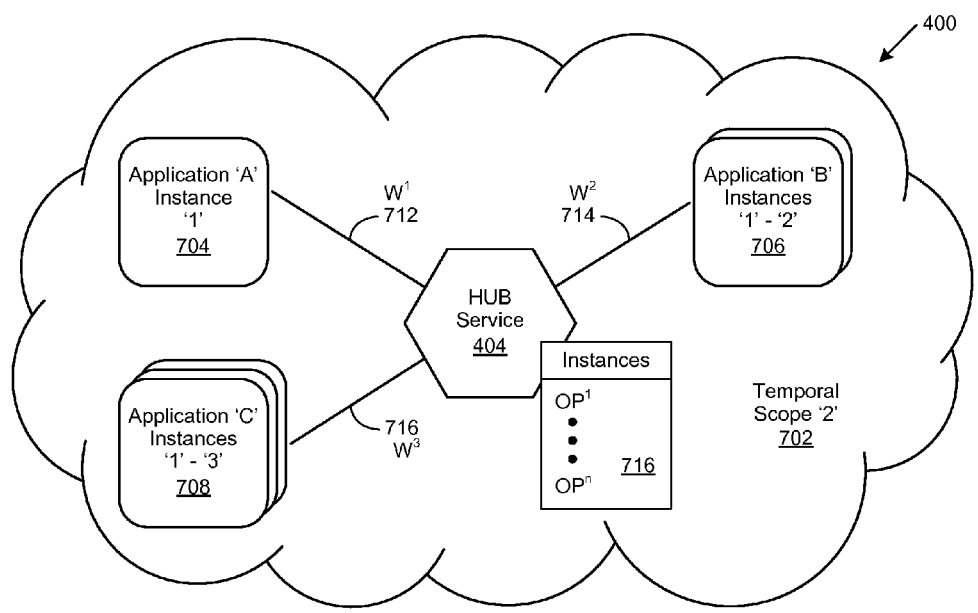

FIGS. 6 and 7 depict the implementation of a capacity-weighted graph in accordance with an embodiment of the invention at different points in time. In various embodiments, application and service requests for additional or fewer resources at runtime in the cloud computing environment evolve over time. In these embodiments, temporal topic maps are implemented with a resource capacity management system to manage changes in time states and corresponding resource capacity requirements. As used herein, a temporal topic map broadly refers to a topic map that provides various time values as part of a metamodel.

In this embodiment, the capacity-weighted graph 400 shows the relationship between a HUB service 402 and various instances of applications 'A' 404, 'B' 406 and 'C' 408, each of which consumes services from the HUB service 402 at a first and second point in time, respectively referenced as temporal scope '1' 602 and '2' 702 in FIG. 6 and FIG. 7. As used herein, temporal scope broadly refers to an interval between two points in time.

In various embodiments, a weighted graph, such as a topic map, is used to generate the capacity-weighted graph 400 at temporal scope '1' 602 and temporal scope '2' 702. In certain embodiments, the weighted graph is generated from a semantic-based, weighted learning graph, which in turn is based upon a weighted topic map. For example, in temporal scope '1' 602, the capacity-weighted graph 400 shows two instances of application 'A' 604, a single instance of application 'B' 606, and three instances of application 'C' 608. However, in temporal scope '1' 602, the capacity-weighted graph 400 shows a single instance of application 'A' 704, two instances of application 'B' 706, and three instances of application 'C' 608.

Skilled practitioners of the art will realize that different instances of applications 'A' 404, 'B' 406 and 'C' 408 being active at temporal scopes '1' 602 and '2' 702 may result in the HUB service 402 providing a corresponding different number of services. By extension, the amount of resources required by the HUB service 402 to provide such services at temporal scopes '1' 602 and '2' 702 may likewise change.

Consequently, the weighted dependency of applications 'A' 404, 'B' 406 and 'C' 408 on the HUB service 402 can respectively expressed as $W^1$ 610, $W^2$ 612 and $W^3$ 614 for temporal scope '1' 602 and $W^1$ 710, $W^2$ 712 and $W^3$ 714 for temporal scope '2' 702.

As an example, for temporal scope '1' 602:

$ID^1$=ID of the 'depends' association (e.g., '10100'), for example, corresponding to weighting (e.g., $W^1$ 610)

$T^1$=an instance of a calling application (e.g., application 'A' 404)

$T^2$=an instance of an API (e.g., the HUB service 404)

$R^1$=App A is Requester of the Hub Service $R^2$=the HUB service 402 is a responder to application 'A' 404

$S^1$=temporal scope '1'

$W^1$=weight of the association=70

Likewise, for temporal scope '1' 702:

$ID^1$=ID of the 'depends' association (e.g., '10100'), for example, corresponding to weighting (e.g., $W^1$ 610)

$T^1$=an instance of a calling application (e.g., application 'A' 404)

$T^2$=an instance of an API (e.g., the HUB service 404)

$R^1$=App A is Requester of the Hub Service $R^2$=the HUB service 402 is a responder to application 'A' 404

$S^1$=temporal scope '2'

$W^1$=weight of the association=50

In various embodiments, historical trends in weights can be determined through the use of prescriptive analytics approaches to those of skill in the art, and by extension predict future topology requirements).

As outlined in the various situations described earlier, when the system of apps and services is deployed to a runtime, the capacity weighted graph will be refined based on observed service consumption using an IT operational system familiar to those of skill in the art for measuring such consumption. When the system is deployed, the IT operational system is informed of expected capacity needs based on the calculated capacity weighted graph and allocates runtime resources accordingly. If the IT operational systems observe workload diverging from the expected capacity needs, the IT operational system informs the system maintaining the capacity weighted graph about the observed discrepancies. Using this new information, the application/service consumption relationships are updated with new capacity expectations and the entire capacity weighted graph is re-calculated and sent back to the operational system for adjustment of allocated operational resources. In that fashion the capacity management system always has an updated projecting of global required capacity.

Once the globally needed capacity for a service has been calculated, the actual resource assignments and capacity changes are implemented using standard platform services. For example in cloud deployed services, PaaS and IaaS provide this capability for elasticity at the platform and hardware levels.

Figure 8:
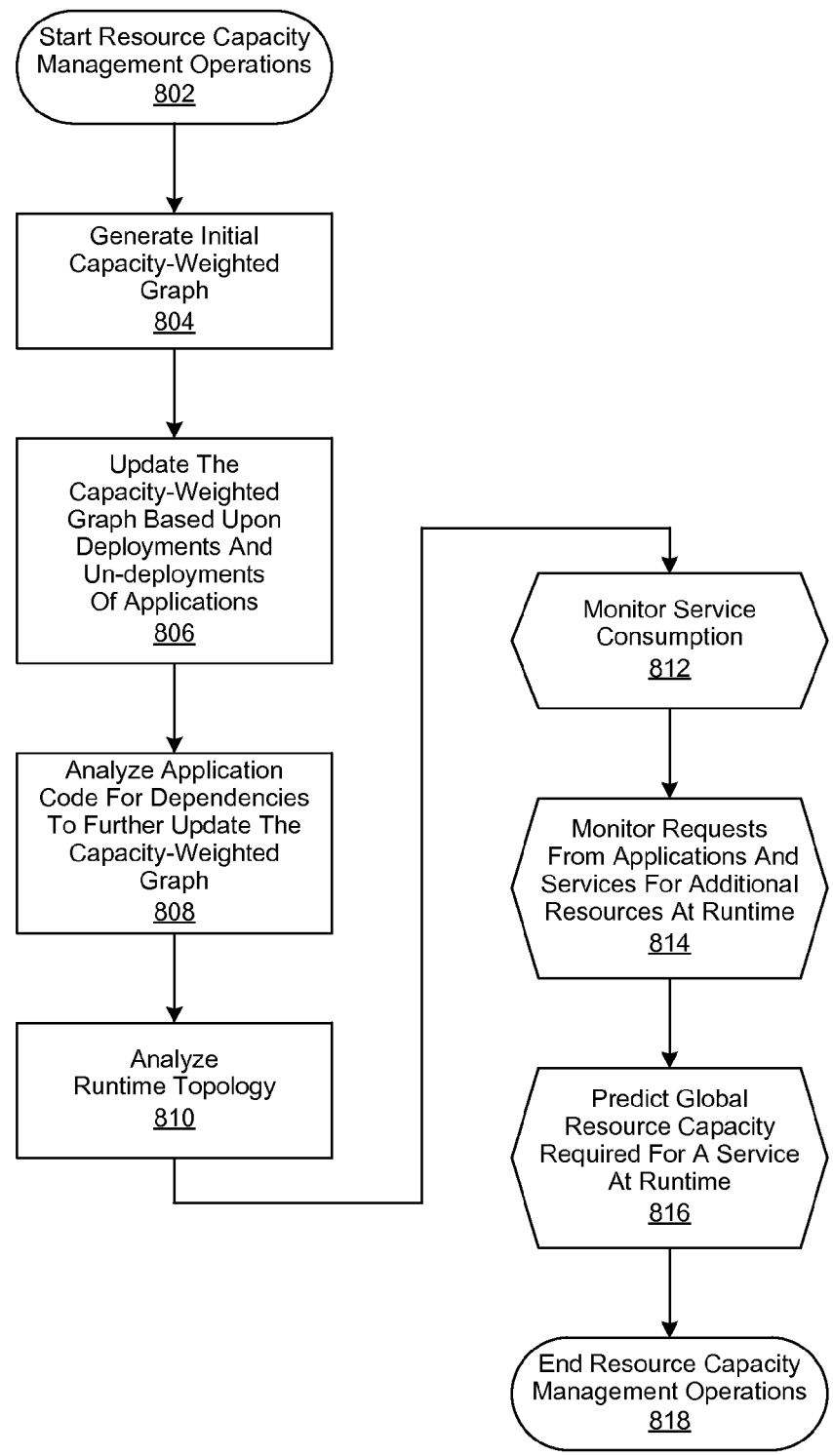
FIG. 8 is a generalized flowchart of operations performed to manage resource capacity in a cloud computing environment.

FIG. 8 is a generalized flowchart of resource capacity management operations performed in accordance with an embodiment of the invention. In this embodiment, resource capacity management operations are begun in step 802, followed by the generation of an initial capacity-weighted graph in step 804. In various embodiments, a weighted graph, such as a topic map, is received as an input, which is then used as described in greater detail herein to generate the capacity-weighted graph.

The capacity-weighted graph is then updated in step 806, as described in greater detail herein, based upon deployments and undeployments of various applications within the cloud computing environment. Then, in step 808, application code associated with the deployed applications is analyzed for dependencies to further update the capacity-weighted graph. Additional updates to the capacity-weighted graph are then performed in step 810 as a result of analyzing the runtime topology of the cloud computing environment.

Ongoing operations are then performed in step 812 to monitor the consumption of services by applications that are deployed within the cloud computing environment. Thereafter, ongoing operations are performed in step 814 to monitor requests from applications and services for additional resources at runtime, followed by ongoing operations being performed in step 816 to predict global resource capacity for individual services at runtime. Resource capacity management operations are then ended in step 818.

Although the present invention has been described in detail, it should be understood that various changes, substitutions and alterations can be made hereto without departing from the spirit and scope of the invention as defined by the appended claims.

What is claimed is:

1. A computer-implemented method for managing resource capacity for the provision of cloud-based services within a cloud computing environment, the cloud computing environment comprising a resource capacity management system executing on a computer system, an anomaly detection service, a hub service and a plurality of application instances, comprising:

generating a capacity-weighted graph configured to receive application deployment and undeployment data associated with a plurality of applications implemented within a cloud computing environment, each of the plurality of applications having an associated application instance, the plurality of applications comprising a water conservation application and a pipe failure prediction application, the water conservation application having an associated water conservation application instance, the associated water conservation application instance providing associated functional deployment capabilities, the associated functional deployment capabilities being represented by a data access functional model, a business rule management system functional model, a reporting functional model and a presentation functional model, the pipe failure prediction application having an associated pipe failure prediction instance, the pipe failure prediction application instance providing associated functional deployment capabilities, the associated functional deployment capabilities being represented by a data access functional model, a notification functional model, a business process management functional model, a presentation functional model and a key performance indicator functional model;

processing, via the resource capacity management system, a first set of application deployment and undeployment data to:
perform a first update of the capacity-weighted graph to reflect a first set of deployed applications; and
determine a first set of resource dependencies associated with the first set of deployed applications;

monitoring, via the resource capacity management system, current consumption of a first set of services associated with the first set of deployed applications; and monitoring, via the resource capacity management system, requests from the first set of deployed applications to predict the need for the provision of a first set of additional services for consumption at runtime.

2. The method of claim 1, further comprising:
receiving a second set of application deployment and undeployment data;
processing the second set of application deployment and undeployment data to:
perform a second update of the capacity-weighted graph to reflect a second set of deployed applications; and
determine a second set of resource dependencies associated with the second set of deployed applications;
monitoring current consumption of a second set of services associated with the second set of deployed applications; and
monitoring requests from the second set of deployed applications to predict the need for the provision of a second set of additional services for consumption at runtime.

3. The method of claim 1, further comprising:
performing resource capacity prediction operations to determine global resource capacity within the cloud computing environment for a service associated with an individual application of the plurality of applications.

4. The method of claim 2, wherein a set of resources is associated with:
each service that is a member of the first and second sets of services; and
each service that is a member of the first and second set of additional services.

5. The method of claim 2, wherein:
the capacity-weighted graph comprises a list of records configured to maintain a record of the consumption of individual services that are members of the first and second set of services by each member of the first and second set of deployed applications.

6. The method of claim 2, wherein:
the first and second set of resource dependencies are determined through the use of a partial topic map associated with the capacity-weighted graph.

7. A system comprising:
a processor;
a data bus coupled to the processor; and
a computer-usable medium embodying computer program code, the computer-usable medium being coupled to the data bus, the computer program code used for managing resource capacity for the provision of cloud-based services within a cloud computing environment, the cloud computing environment comprising a resource capacity management system executing on a computer system, an anomaly detection service, a hub service and a plurality of application instances and comprising instructions executable by the processor and configured for:
generating a capacity-weighted graph configured to receive application deployment and undeployment data associated with a plurality of applications implemented within a cloud computing environment, each of the plurality of applications having an associated application instance, the plurality of applications comprising a water conservation application and a pipe failure prediction application, the water conservation application having an associated water conservation application instance, the associated water conservation application instance providing associated functional deployment capabilities, the associated functional deployment capabilities being represented by a data access functional model, a business rule management system functional model, a reporting functional model and a presentation functional model, the pipe failure prediction application having an associated pipe failure prediction instance, the pipe failure prediction application instance providing associated functional deployment capabilities, the associated functional deployment capabilities being represented by a data access functional model, a notification functional model, a business process management functional model, a presentation functional model and a key performance indicator functional model;
processing, via the resource capacity management system, a first set of application deployment and undeployment data to:
perform a first update of the capacity-weighted graph to reflect a first set of deployed applications; and
determine a first set of resource dependencies associated with the first set of deployed applications;
monitoring, via the resource capacity management system, current consumption of a first set of services associated with the first set of deployed applications; and
monitoring, via the resource capacity management system, requests from the first set of deployed applications to predict the need for the provision of a first set of additional services for consumption at runtime.

8. The system of claim 7, further comprising:
receiving a second set of application deployment and undeployment data;
processing the second set of application deployment and undeployment data to:
perform a second update of the capacity-weighted graph to reflect a second set of deployed applications; and
determine a second set of resource dependencies associated with the second set of deployed applications;
monitoring current consumption of a second set of services associated with the second set of deployed applications; and
monitoring requests from the second set of deployed applications to predict the need for the provision of a second set of additional services for consumption at runtime.

9. The system of claim 7, further comprising:
performing resource capacity prediction operations to determine global resource capacity within the cloud computing environment for a service associated with an individual application of the plurality of applications.

10. The system of claim 8, a set of resources is associated with:
each service that is a member of the first and second sets of services; and
each service that is a member of the first and second set of additional services.

11. The system of claim 8, wherein:
the capacity-weighted graph comprises a list of records configured to maintain a record of the consumption of individual services that are members of the first and second set of services by each member of the first and second set of deployed applications.

12. The system of claim 8, wherein:
the first and second set of resource dependencies are determined through the use of a partial topic map associated with the capacity-weighted graph.

13. A non-transitory, computer-readable storage medium embodying computer program code for managing resource capacity for the provision of cloud-based services within a cloud computing environment, the cloud computing environment comprising a resource capacity management system executing on a computer system, an anomaly detection service, a hub service and a plurality of application instances, the computer program code comprising computer executable instructions configured for:
generating a capacity-weighted graph configured to receive application deployment and undeployment data associated with a plurality of applications implemented within a cloud computing environment, each of the plurality of applications having an associated application instance, the plurality of applications comprising a water conservation application and a pipe failure prediction application, the water conservation application having an associated water conservation application instance, the associated water conservation application instance providing associated functional deployment capabilities, the associated functional deployment capabilities being represented by a data access functional model, a business rule management system functional model, a reporting functional model and a presentation functional model, the pipe failure prediction application having an associated pipe failure prediction instance, the pipe failure prediction application instance providing associated functional deployment capabilities, the associated functional deployment capabilities being represented by a data access functional model, a notification functional model, a business process management functional model, a presentation functional model and a key performance indicator functional model;
processing, via the resource capacity management system, a first set of application deployment and undeployment data to:
perform a first update of the capacity-weighted graph to reflect a first set of deployed applications; and
determine a first set of resource dependencies associated with the first set of deployed applications;
monitoring, via the resource capacity management system, current consumption of a first set of services associated with the first set of deployed applications; and
monitoring, via the resource capacity management system, requests from the first set of deployed applications to predict the need for the provision of a first set of additional services for consumption at runtime.

14. The non-transitory, computer-readable storage medium of claim 13, further comprising:
receiving a second set of application deployment and undeployment data;
processing the second set of application deployment and undeployment data to:
perform a second update of the capacity-weighted graph to reflect a second set of deployed applications; and
determine a second set of resource dependencies associated with the second set of deployed applications;
monitoring current consumption of a second set of services associated with the second set of deployed applications; and
monitoring requests from the second set of deployed applications to predict the need for the provision of a second set of additional services for consumption at runtime.

15. The non-transitory, computer-readable storage medium of claim 13, further comprising:
performing resource capacity prediction operations to determine global resource capacity within the cloud computing environment for a service associated with an individual application of the plurality of applications.

16. The non-transitory, computer-readable storage medium of claim 15, wherein a set of resources is associated with:
each service that is a member of the first and second sets of services; and
each service that is a member of the first and second set of additional services.

17. The non-transitory, computer-readable storage medium of claim 15, wherein:
the capacity-weighted graph comprises a list of records configured to maintain a record of the consumption of individual services that are members of the first and second set of services by each member of the first and second set of deployed applications.

18. The non-transitory, computer-readable storage medium of claim 15, wherein:
the first and second set of resource dependencies are determined through the use of a partial topic map associated with the capacity-weighted graph.

19. The non-transitory, computer-readable storage medium of claim 13, wherein the computer executable instructions are deployable to a client system from a server system at a remote location.

20. The non-transitory, computer-readable storage medium of claim 13, wherein the computer executable instructions are provided by a service provider to a user on an on-demand basis.

* * * * *